United States Patent
Ramabadran (10) Patent No.: US 10,812,364 B1
(45) Date of Patent: Oct. 20, 2020

(54) TESTING FORWARDING STATES OF A NETWORK DEVICE USING PROBE DETECTION AND REFLECTION

(71) Applicant: Amazon Technologies, Inc., Seattle, WA (US)

(72) Inventor: Srinivasan Ramabadran, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/020,857

(22) Filed: Jun. 27, 2018

(51) Int. Cl.
*H04L 12/26* (2006.01)
*H04L 29/06* (2006.01)
*H04L 12/741* (2013.01)
*H04L 12/935* (2013.01)

(52) U.S. Cl.
CPC .......... *H04L 43/50* (2013.01); *H04L 43/0829* (2013.01); *H04L 43/12* (2013.01); *H04L 45/745* (2013.01); *H04L 49/3063* (2013.01); *H04L 63/101* (2013.01)

(58) Field of Classification Search
CPC ....... H04W 40/00; H04W 88/16; H04W 8/18; H04W 36/02; H04W 40/02; H04W 40/36; H04W 80/04
See application file for complete search history.

(56) References Cited

U.S. PATENT DOCUMENTS

| | | |
|---|---|---|
| 7,457,277 B1 | 11/2008 | Sharma et al. |
| 8,427,970 B2 | 4/2013 | Benkis |
| 8,472,315 B2 | 6/2013 | Sommerville et al. |
| 8,670,326 B1 | 3/2014 | Balasubramanian et al. |
| 9,083,347 B1 | 7/2015 | Remla et al. |
| 9,491,083 B2 | 11/2016 | Brolin et al. |
| 9,547,570 B2 | 1/2017 | Chu et al. |
| 9,577,911 B1 | 2/2017 | Castleman |
| 9,596,164 B1 | 3/2017 | Kumar et al. |
| 9,699,030 B1 | 7/2017 | Kumar |
| 9,954,751 B2 | 4/2018 | Zhang et al. |
| 10,038,597 B2 | 7/2018 | Casado et al. |
| 10,044,646 B1 | 8/2018 | Detwiler |
| 10,200,279 B1 | 2/2019 | Aljaedi |

(Continued)

OTHER PUBLICATIONS

Zeng et al., "Automatic Test Packet Generation," Proceedings of the 8th International Conference on Emerging Networking Experiments and Technologies, Dec. 2012, 12 pages.
U.S. Appl. No. 16/020,844, filed Jun. 27, 2018, Ramabadran et al.

*Primary Examiner* — Natasha W Cosme
(74) *Attorney, Agent, or Firm* — Klarquist Sparkman, LLP (57) ABSTRACT

A deterministic model is described that is used for testing networks by exercising forwarding rules (e.g., layer 2 and layer 3) on network devices. Probe detection on a peer network device B can be implemented using a global register available to all input pipelines. The global register can be used to check a source and destination port in a User Datagram Protocol (UDP) header. If there is a match, the packet is considered a probe, and a probe detection signal is transmitted to an output pipeline to redirect the probe back to the input port. Network device A can then capture the reflected probe using layer 2 hardware and redirect it to the CPU in order to verify the actual forwarding behavior applied on the probe packet. In an alternative embodiment, probe detection logic can be incorporated in an ACL at a beginning of a pipeline for switching packets.

17 Claims, 11 Drawing Sheets

(56) References Cited

U.S. PATENT DOCUMENTS

| | | |
|---|---|---|
| 10,439,880 B2 | 10/2019 | Bryant et al. |
| 10,462,037 B1 | 10/2019 | Ramabadran et al. |
| 2003/0185210 A1 | 10/2003 | McCormack |
| 2008/0117829 A1 | 5/2008 | Nakano et al. |
| 2009/0316588 A1 | 12/2009 | Nakamura |
| 2010/0014518 A1 | 1/2010 | Duncan et al. |
| 2014/0092751 A1 | 4/2014 | Meilik et al. |
| 2014/0119203 A1 | 5/2014 | Sundaram et al. |
| 2014/0119379 A1 | 5/2014 | Liang et al. |
| 2015/0188798 A1 | 7/2015 | Mizrahi et al. |
| 2015/0222533 A1 | 8/2015 | Birrittella et al. |
| 2016/0094439 A1 | 3/2016 | Ravindran et al. |
| 2016/0127192 A1 | 5/2016 | Bryant et al. |
| 2016/0254985 A1 | 9/2016 | Judge et al. |
| 2017/0222881 A1 | 8/2017 | Holbrook et al. |
| 2017/0346765 A1 | 11/2017 | Immidi |
| 2018/0091405 A1 | 3/2018 | Koktan et al. |
| 2018/0167294 A1 | 6/2018 | Gupta et al. |
| 2018/0212876 A1 | 7/2018 | Bacthu et al. |
| 2019/0052552 A1 | 2/2019 | Holbrook et al. |
| 2019/0052556 A1 | 2/2019 | Duda et al. |
| 2019/0182166 A1 | 6/2019 | Ghazisaeedi et al. |
| 2019/0273681 A1 | 9/2019 | Williams et al. |

TESTING FORWARDING STATES OF A NETWORK DEVICE USING PROBE DETECTION AND REFLECTION

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses, error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path (ECMP) routing, which is a strategy where next-hop packet forwarding to a destination can occur over multiple best paths. ECMP is per-hop decision limited to a single router, and can be inefficient if routers in the network are not functioning.

Testing of network switches can be problematic. Typically, test probes are sent from a source host device through a network of switches to a destination host device. The probes are effective at testing the paths and links in the network, but not effective at testing forwarding states of the network devices themselves.

DETAILED DESCRIPTION

A deterministic model is described that is used for testing networks by exercising forwarding states (e.g., layer 2 and layer 3) on network devices. Incorrect forwarding states, if left undetected, can result in packet loss. The system can generate a signal that eliminates manual troubleshooting efforts for each occurrence of grey failures by transmitting probes between neighbor network devices used to test the forwarding states of the devices. With two neighboring devices (e.g., a source network device A and a peer network device B), a light-weight agent resides on a source device and can be used to control the testing. Probe allocation can be managed locally on the source network device based on a layer 3 routing table and ECMP links. One or more probes originating from the source network device from a local CPU are routed on the same network device A in hardware and sent out on an ECMP member link towards the peer network device. The peer device B captures the probe and reflects the probe back to network device A on the ingress port. Network device A can then capture the reflected probe to verify the actual forwarding behavior applied on the probe packet. Probe detection on the peer network device B can be implemented using a global register available to some or all input pipelines. The global register can be used to check a source and destination port in a User Datagram Protocol (UDP) header. If there is a match, the packet is considered a probe, and a probe detection signal is transmitted to an output pipeline to redirect the probe back to the input port. In an alternative embodiment, Access Control List (ACL) hardware can be positioned at a front end of a pipeline and can store source and destination ports for matching against incoming packets so as to detect a probe.

Figure 1:
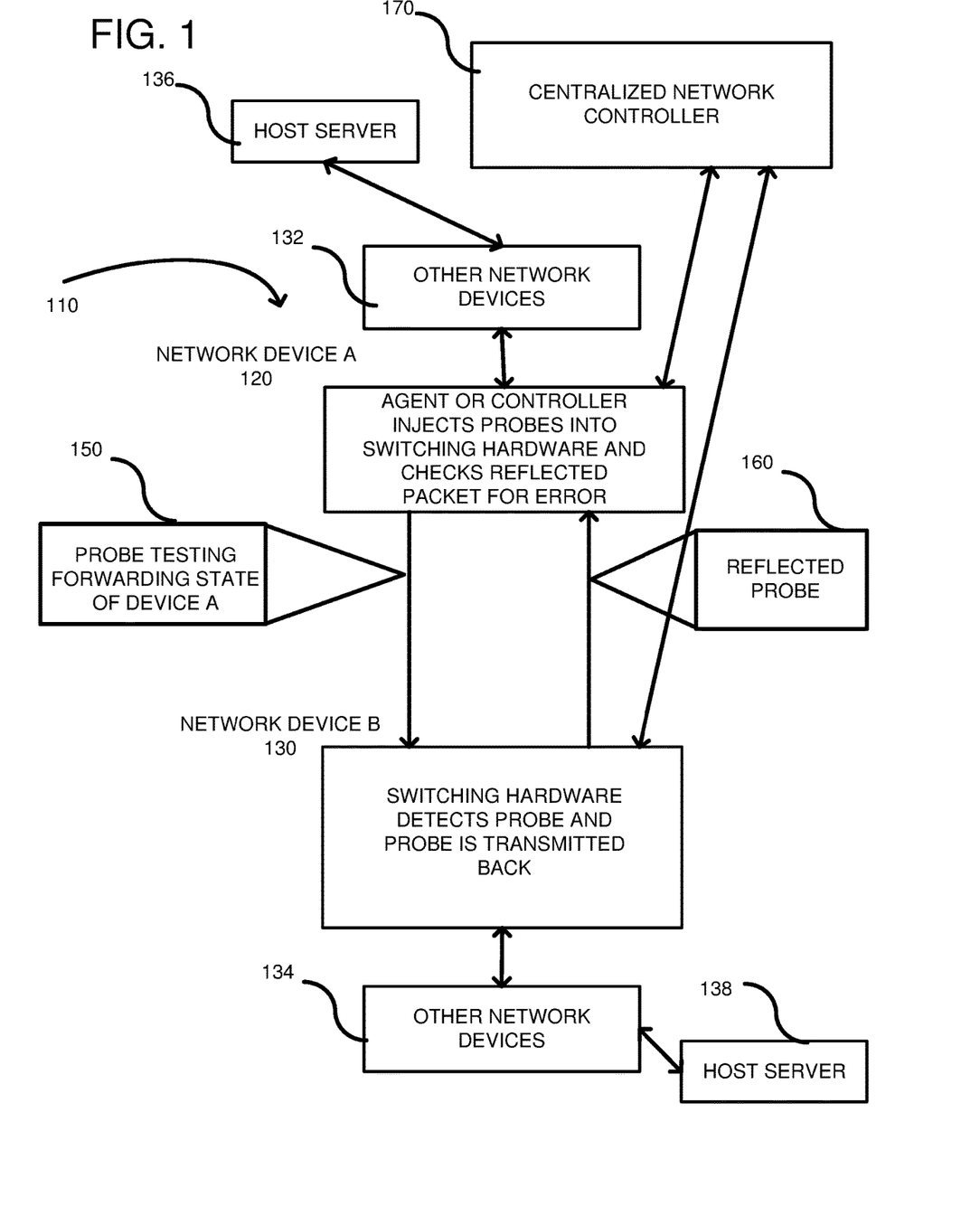
FIG. 1 is a diagram illustrating a network of switches with two neighbor switches, network device A and network device B, exchanging a probe so as to test forwarding states of the network devices.

FIG. 1 shows a network 110 wherein network devices A 120 and B 130 are neighbor devices that cooperatively test at least one forwarding table (such as in network device A) using multiple probes transmitted from network device A 120 to network device B 130 and reflected back to the network device A. The network devices 120, 130 can be any switches for forwarding packet data including, but are not limited to, routers, switches, load balancers, firewalls, etc. In some embodiments, the network device 130 can be a host server computer, rather than a network device. The network devices 120 and 130 can be directly coupled together without intervening devices there between. In other embodiments, the network devices 120, 130 can have an intermediate layer 2 node there between. The network devices 120, 130 are part of a larger network of devices shown at 132, 134 that interconnect host server computers 136, 138 together so as to route traffic between the host server computers. As shown, network device A 120 has an agent or controller positioned thereon that injects a probe network packet 150 into switching hardware on a data plane (described further below). The probe network packet progresses through layer 2 and layer 3 lookups on the network device A so as to test the forwarding states. If the lookups are correct, the probe network packet 150 is transmitted from network device A to network device B and uses a real or faux network forwarding address just as though it is a real packet. Thus, the network device B 130 is not the destination address for the probe network packet 150. Rather, the destination address is another IP address in the network. Network device B 130 then receives the probe 150 on a port (not shown) and treats the probe 150 as any other packet in that the packet progresses through layer 2 and layer 3 routing hardware. The probe 150 is checked to determine whether it is a test probe by checking a source and destination port in a UDP header against predetermined source and destination ports. If there is a match, then a flag can be set indicating the received packet is a probe. The packet then continues through the input pipeline. As a result of the layer 3 lookup, a Media Access Control (MAC) header on the packet is modified or otherwise added to the packet. When the packet reaches an output pipeline, a check is made whether the flag is set indicating the packet is a probe. If so, the layer 3 lookup and port determination are ignored. Instead, the output pipeline reverts back to the received probe and reflects the probe back on the same port in which it was received, as shown at 160.

Network device A 120 can then check the reflected probe 160 and detect that it is a probe (by matching the UDP header, for example) and transmit the probe to an agent or controller that can check that the forwarding information is correct on network device A 120. For example, network device A can check that it received the reflected probe 160 from the correct network device, which confirms that the layer 2 lookup on network device A was performed correctly and the layer 3 lookup transmitted the probe to the correct port. Thus, the forwarding states of network device A 120 can be confirmed by sending multiple probes between neighbor devices to test all of the forwarding states. Although only two network devices 120, 130 are shown exchanging packets, the other network devices 132, 134 can perform similar tests on respective neighbor devices. In this way, forwarding rules on the network devices are tested rather than testing merely links, which can happen when probes are sent from host 136 to host 138. A centralized controller 170 can execute on a server computer and communicate with the network devices, such as network device A and network device B, so as to receive reports of errors in the forwarding rules of those devices. For example, network device A can transmit a FIB error to the centralized controller 170 if there was a lookup error. Other error messages can also occur, such as if network device A received no return message at all after injecting the probe into its ingress pipeline.

Figure 2:
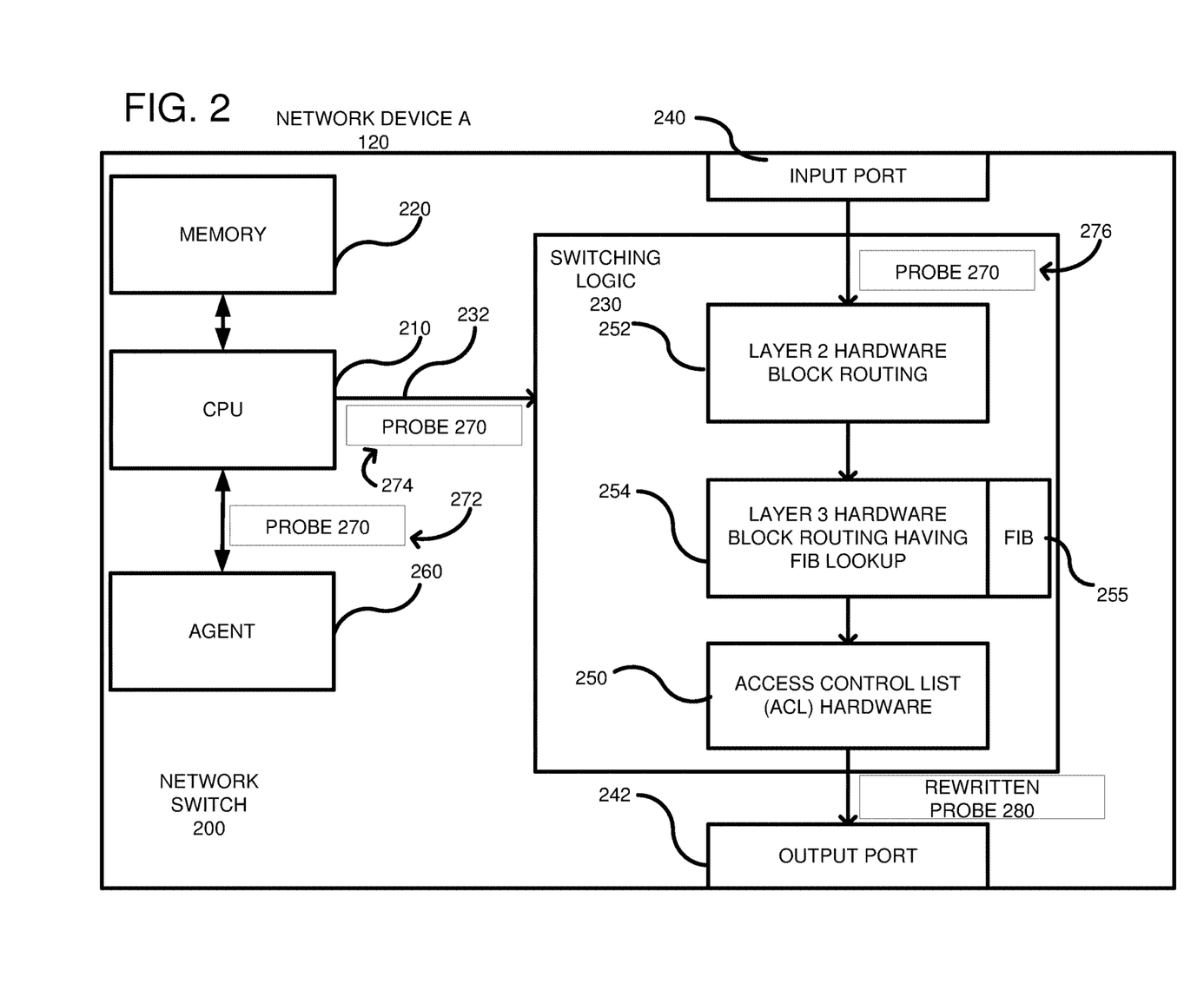
FIG. 2 is a detailed diagram of a first embodiment showing the network device A injecting a probe into switching logic using an agent for transmitting the probe to the network device B.

FIG. 2 shows a detailed example of an embodiment of the network device 120. Network device A 120 is a switch that routes packets to a next hop in the network using a destination IP address. A CPU 210 is coupled to a memory 220 and to switching logic 230 through a bus 232 (PCIe or other protocols and bus types can be used). The switching logic 230 is positioned between an input port 240 and an output port 242, which are typically adapted to receive network cables, such as Ethernet cables. The switching logic 230 can be a single ASIC integrated circuit or divided into multiple integrated circuits. The switching logic 230 can include multiple different hardware logic blocks including a layer 2 hardware block 252, a layer 3 hardware block 254, and an Access Control List (ACL) hardware block 250. The layer 2 hardware block 252 relates to an Ethernet layer and can forward packets based on MAC tables. The layer 2 lookup ensures that an incoming packet's MAC address equals the MAC address of the network device A. If so, then the packet can proceed onto the layer 3 hardware. If not, then the layer 3 lookup does not occur. The layer 3 hardware block 254 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 255, which includes destination addresses for packets being transmitted through the switching logic. The network device A 120 can run routing protocols, such as an Open Shortest Path First (OSPF) or a Routing Information Protocol (RIP), to communicate with other Layer 3 switches or routers. The routing tables are used to lookup the route for an incoming packet. The ACL block 250 relates to permissions and can include rules whether to drop packets. The different hardware blocks can be coupled in series and additional hardware blocks can be added based on the design. Packets pass from the input port 240 to the output port in accordance with the configuration of the hardware logic blocks 250, 252, 254. Although only a single input and output port are shown, usually there are multiple ports on the switch.

As shown, an agent 260 can execute on the CPU 210 and can be used to control testing of one or more network devices using a probe 270. As shown at 272, the agent 260 passes the probe to the CPU hardware 210 for transmitting the probe to the switching logic 230 via the bus 232 (as shown at 274). The probe is then injected into an input pipeline of the switching logic as shown at 276 (such as via the CPU port), such that it passes through layer 2 hardware 252, layer 3 hardware 254 and the ACL hardware 250. The probe 270 includes an appropriate MAC address that matches a MAC address of the network device A 120 so that layer 3 hardware switching occurs. Specifically, the probe includes a layer 2 header wherein the destination MAC address equals a MAC address of network device A 120. The probe packet 270 also includes a destination address that is an IP address (faux or real) within the layer 3 lookup tables (the FIB 255). More particularly, the layer 3 hardware 254 performs a lookup on a prefix of the probe 270 and determines a proper output port 242 that directs the probe packet 270 towards network device B 130 (see FIG. 1). Alternatively, the probe 270 can have the full IP destination address (which includes the prefix) for lookup in the layer 3 hardware 254. In either case, the agent 260 ensures that the probe 270 includes a destination address that is found in the FIB so as to test the forwarding states of the switching logic 230. The probe is rewritten, as shown at 280, to include a proper MAC address for the network device B 130 and sent to an output port 242 indicated by the layer 3 hardware 254. The input port 240, output port 242 and switching logic 230 can be considered a data plane of the network device A 120. By contrast, the CPU 210, memory 220, and agent 260 are considered part of a control plane.

Figure 3:
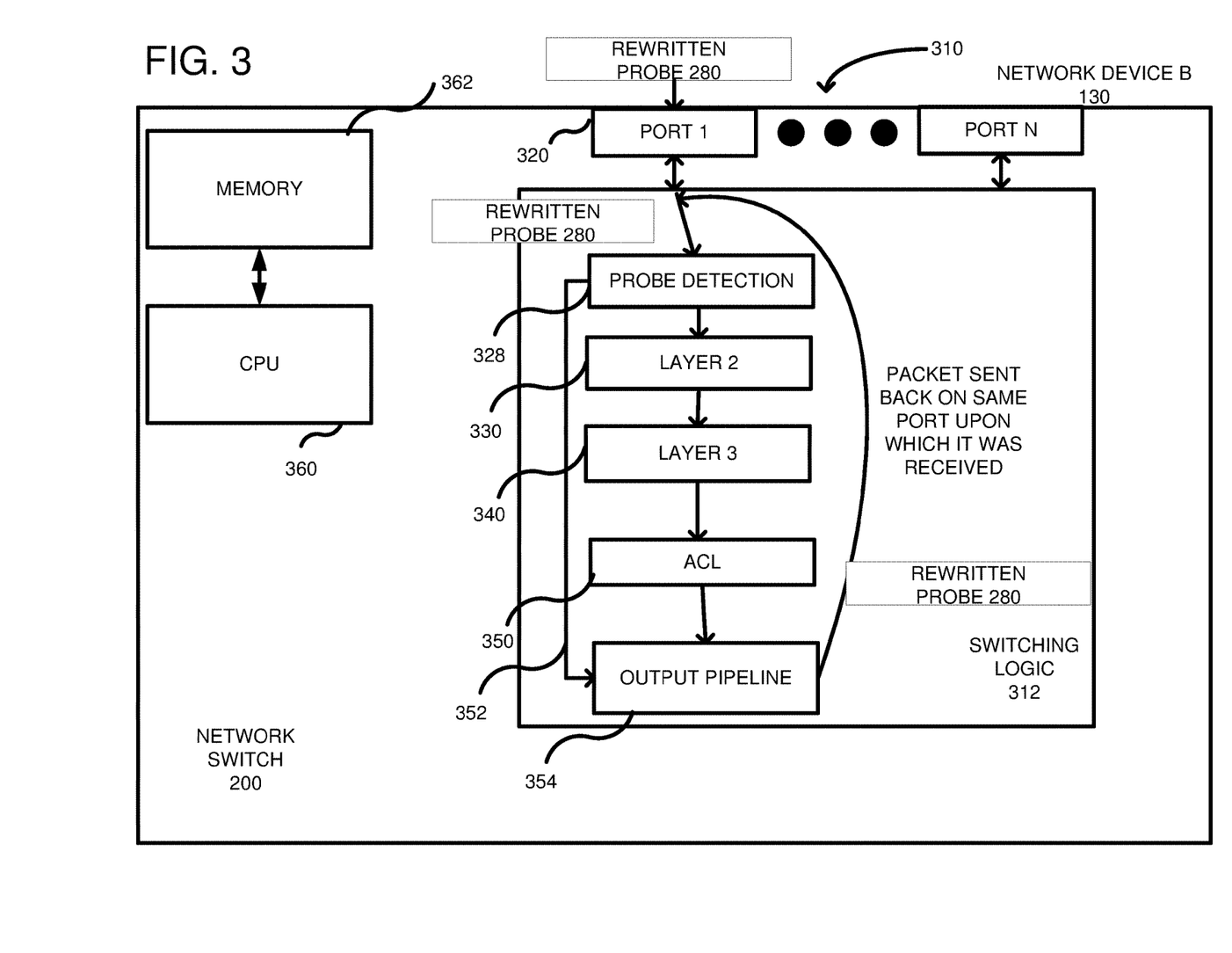
FIG. 3 shows the probe of FIG. 2 being received by the neighbor network device B and transmitted back to network device A on the same port upon which the probe was received.

FIG. 3 provides further details of network device B 130. As shown, the network device B 130 includes multiple ports (1 through N, wherein N is any integer value), shown generally at 310, used for inputting and transmitting packets from the network switch. Additionally, the network device B 130 includes switching logic 312 coupled to the ports. The rewritten probe 280 from network device A 120 (FIG. 2) is shown being transmitted to network device B 130 and arrives on Port 1 320 (which port it is received upon depends on the cabling between hops). The rewritten probe 280 first goes into probe detection logic 328. As described further below, the probe detection logic 328 can determine whether the incoming packet is normal traffic or a test probe by comparing a source and destination port in the UDP header against predetermined source and destination ports. If there is a match, the probe detection circuitry 328 can set a flag, which represents a probe detection signal on signal line 352. The rewritten probe 280 passes through layer 2 hardware 330, layer 3 hardware 340 and the ACL hardware 350. Layer 2, layer 3 and the ACL act on the rewritten probe 280 just as any other network packets. However, when the packet reaches an output pipeline 354 for transmission on a port determined by the layer 3 hardware 340, the output pipeline 354 switches the output port in response to the probe detection signal 352. More specifically, the output pipeline 354 changes the output port from the port selected by the layer 3 hardware to the port 310 upon which the rewritten probe 280 was received, which in this example is port 1 320. Moreover, the output pipeline 354 disregards or ignores any rewrite performed by the layer 3 hardware 340 and reverts back to the originally received packet 280 received on the port 320. Thus, to network device A, it receives the same packet back 280 on the same port that it was sent upon.

Figure 4:
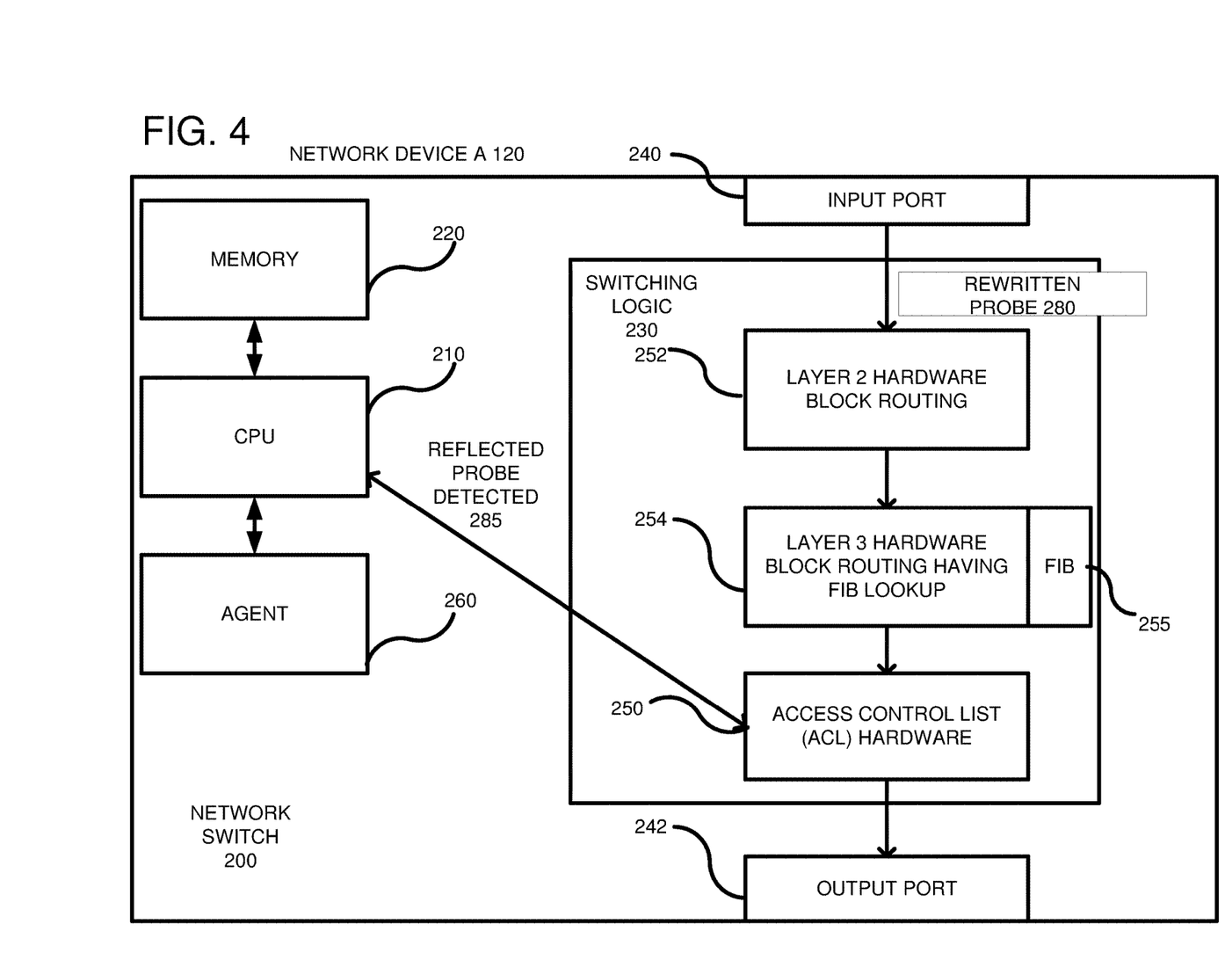
FIG. 4 shows network device A receiving back the probe of FIG. 3 for testing whether the probe was properly forwarded to network device B.

FIG. 4 shows the probe 280 being received back in network device A on the input port 240. The probe 280 again goes through layer 2 252 and layer 3 254 hardware. However, due to an incorrect MAC address, the layer 2 252 hardware controls that the layer 3 lookup does not occur. The probe 280 is then detected in the ACL hardware 250 through a signature match (and an input port match) and is transmitted to the agent 260 executing on the CPU 210. The agent 260 can check the rewritten probe 280 to ensure that the layer 2 hardware 252 and layer 3 hardware 254 performed proper lookups and rewriting of the probe. Thus, the agent 260 effectively tested the layer 2 hardware 252 and the layer 3 hardware 254. Reviewing the previous figures, FIG. 2 shows the network device A 120 transmitting a probe packet 270 after layer 2 and layer 3 lookup. FIG. 3 shows the probe packet received on the network device B, wherein the probe is identified and sent back on the same input port as output port. Then in FIG. 4, network device A receives the probe again, detects the probe signature, overrides the layer 3 hardware 154 lookup and instead routs the probe to the agent 260 as indicated at 285. The agent can then confirm the forwarding state within the FIB 255 as well as proper operation of the layer 2 and layer 3 lookups. Such confirmation is accomplished by comparing the layer 2 header and possibly the layer 3 header and confirming that they are what was expected. For example, the layer 2 header should have a source MAC that is equal to the MAC address for network device B 130. The layer 3 header should have the proper destination IP address and the proper source address. Moreover, the links between network device A 120 and network device B 130 are tested. Any error condition can be reported to the centralized controller 170.

Figure 5:
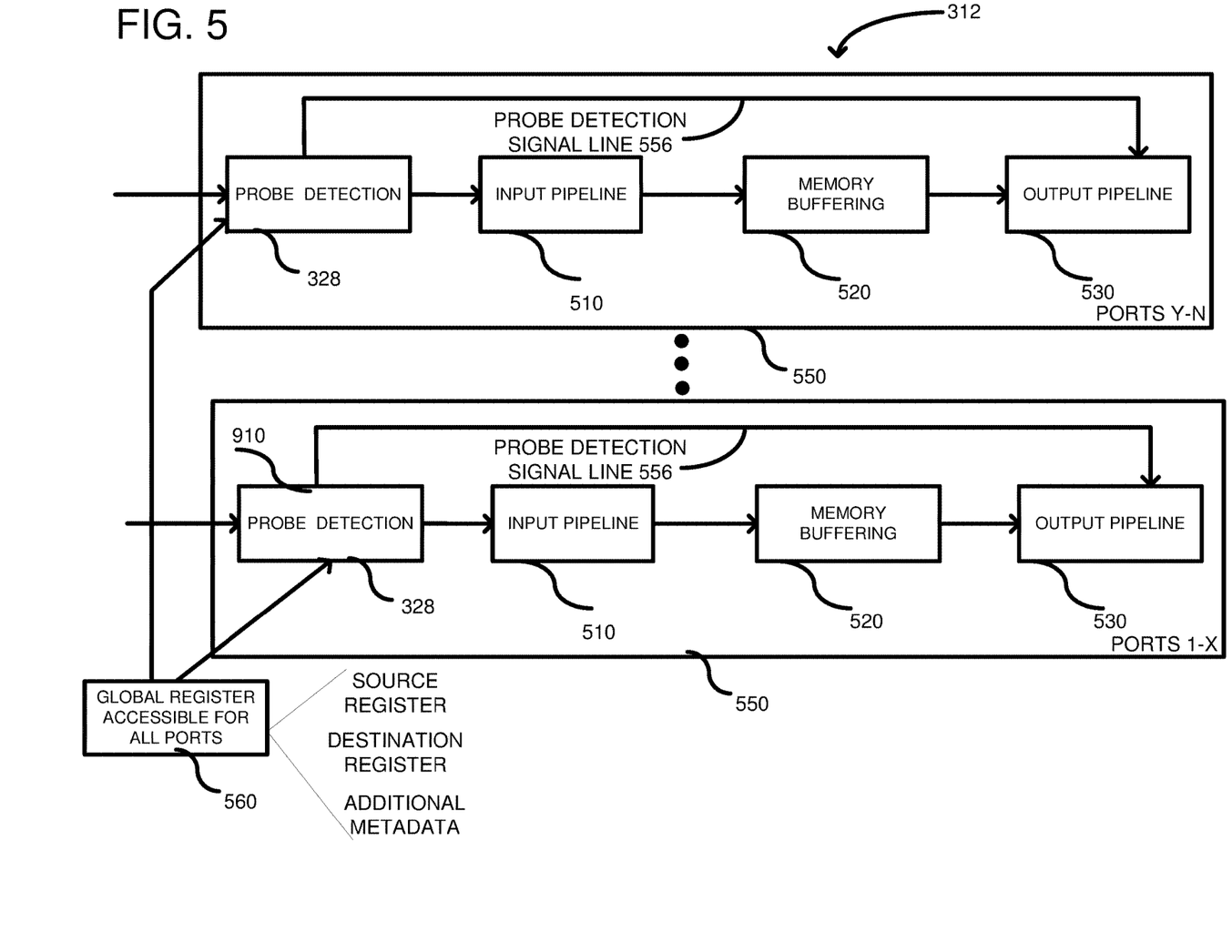
FIG. 5 shows details of an Integrated Circuit (IC) on network device B of FIG. 3 having probe detection logic used to redirect the probe back on the same port upon which it was received.

FIG. 5 is a hardware diagram showing further details of the switching logic 312, which can be within an IC. The switching logic 312 includes probe detection circuitry 328, an input pipeline 410, which can comprise layer 2 hardware, layer 3 hardware and ACL hardware, described above. The switching logic 312 further includes memory buffering 520 coupled to the output of the input pipeline 510. The memory buffering is used to buffer packets prior to transmission on an output pipeline 530. As shown, the different circuit blocks 328, 510, 520, and 530 are within a single integrated circuit 312, which is the switching logic. The probe detection circuitry 328 can analyze a combination of bits within a packet and can generate a trigger if the bits match a predetermined combination. For example, the bits can be a signature in a layer 4 header, such as being based on a TCP header or a UDP header. In one example, bits within a packet's UDP header are used for determining a matching signature. In particular, a source and destination port within the UDP header can be used for matching against predetermined source and destination ports. If there is a match, then the probe detection circuitry can transmit a probe detection signal on a probe detection signal line 556 to the output pipeline 530. As described more fully below, in response to the probe detection signal, the output pipeline can redirect the probe back to the same port in which it was received. The network device can have multiple parallel pipelines 550, one for each port or one for multiple ports. For example, one pipeline 550 is shown for ports 1-X (where X is an integer value), while another pipeline is shown for ports Y-N (where Y and N are any integer numbers). However, as shown at 560, there can be a global register that is available for reading by all of the pipelines 550. The global register 560 can include multiple readable registers, such as a register for storing a signature. In one example, the global register can include a source port, a destination port, and one or more registers for storing metadata, if desired. The source and destination registers are used to store source and destination port information. The metadata field allows the probe detection circuitry 328 decide whether to match other information in the payload or headers of the probe packets. These registers 560 can be programmed by the centralized network controller 170 (FIG. 1) or by the agent 260 (FIG. 2). Other techniques can also be used for programming the registers. 560. The registers 560 can be read by the probe detection circuitry 328 and, a single set of global registers 560 can be read by multiple pipelines 550 independently. The probe detection circuitry 328 can use the global register 560 as a reference to compare against a source port and a destination port in a probe's UDP header. If there is a match, then the probe detection signal line 556 can be activated. Each pipeline can read the global register in parallel and make decisions independent of the other pipelines based on respective packets that are received. Although not shown, there can be additional global registers 560, one for each pipeline 550.

Figure 6:
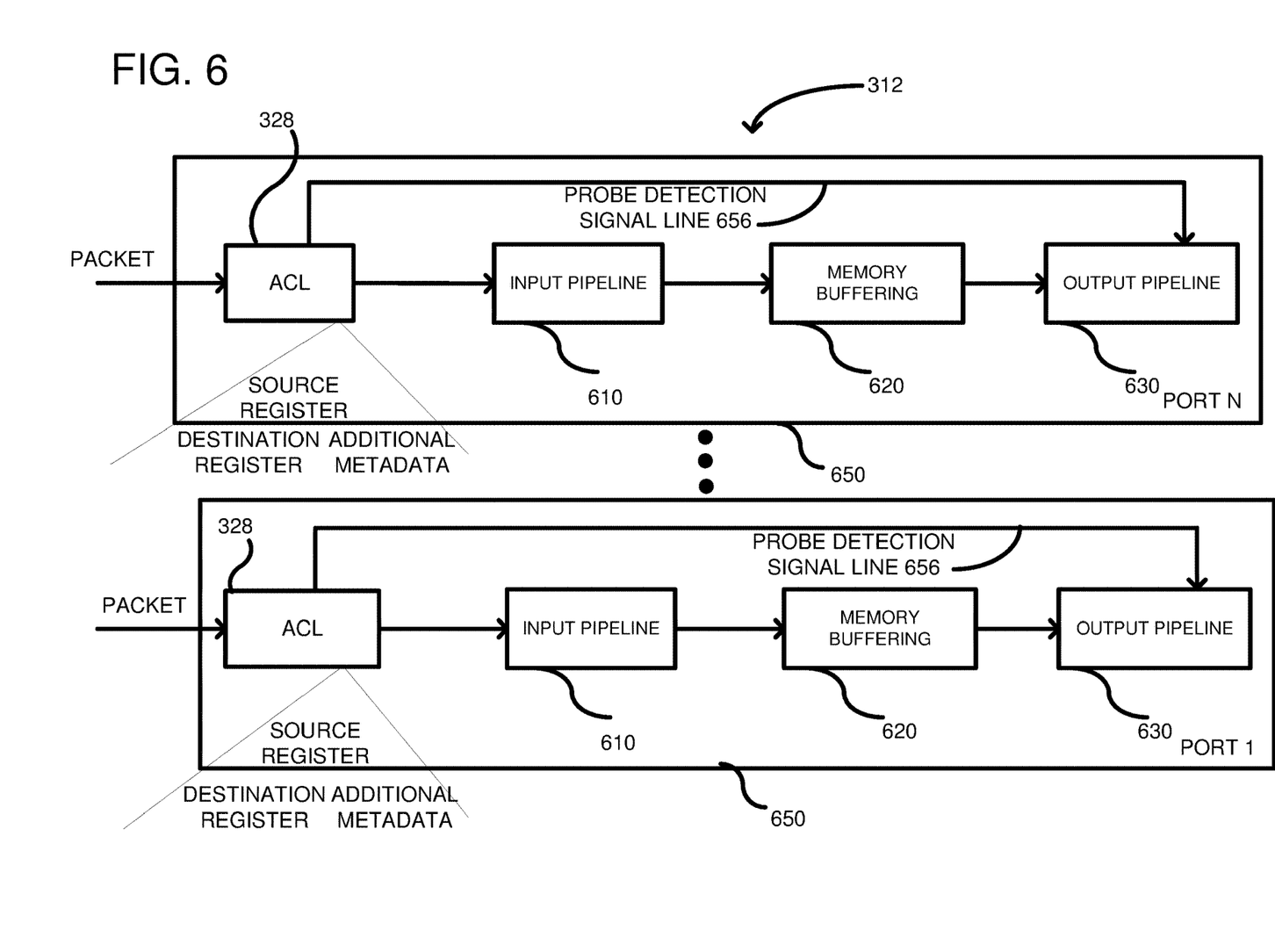
FIG. 6 shows an alternative embodiment of an IC on network device B with probe detection logic integrated into an Access Control Logic (ACL) hardware.

FIG. 6 shows an alternative embodiment of the switching logic 312, which can be within an IC. In this embodiment, the switching logic 312 includes the probe detection logic 328 implemented in ACL circuitry within each pipeline 650. The input pipeline 610, memory buffering 620, and output pipeline 630 are similar to those described above in relation to FIG. 5 and are not discussed again for purposes of brevity. The ACL 328 can include registers for storing a plurality of source ports, destination ports and metadata. Packets received into the pipeline 650 can be analyzed in the ACL 328 to determine if a source and destination port in the UDP header match data in any of the registers of the ACL. If so, then a probe detection signal can be activated on a probe detection signal line 656. Each port 1-N (where N is any integer number) acts on its respective packets independently of the other ports. If the probe detection signal line 656 is activated, then the output pipeline 640 treats the probe as a test probe and reroutes the test probe back to the input port it was received upon, without rewriting the packet in accordance with the layer 3 lookup performed in the input pipeline 610. The registers within the ACL 328 can further include additional metadata should it be desirable to match the source and destination ports, in addition to other header or payload information. Each ACL hardware 328 can be programmed with different source and destination ports so that each pipeline 650 can match on different probes. The ACLs 328 can be programmed using the centralized controller 170 or by the source network device A 120

Figure 7:
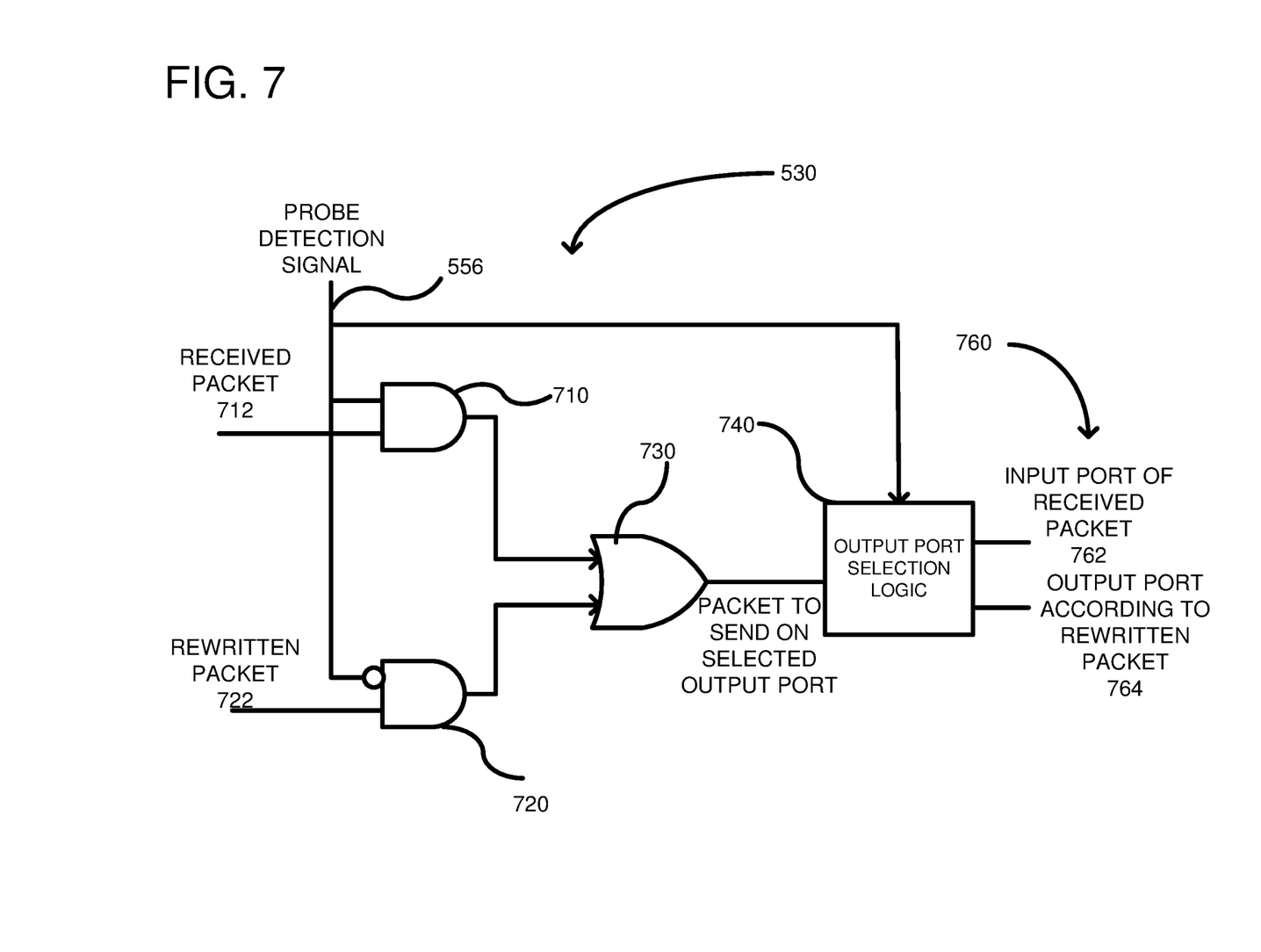
FIG. 7 is a hardware diagram of an output pipeline of FIG. 5 or 6.

FIG. 7 is an example embodiment of the output pipeline 530 of FIG. 5. The output pipeline 630 of FIG. 6 can also be the same design. The output pipeline receives the probe detection signal on probe detection signal line 556. If the probe detection signal is activated, then an AND gate 710 allows a packet received on one of the input ports 310 (FIG. 3) (packet 712) to be transmitted through an OR gate 730 to an output port selection logic 740, which outputs the packet on an output port 760. More specifically, as shown at 762, the packet is rerouted back to the input port in which it was received. At the same time, a packet 722 rewritten by the layer 3 hardware 340 is dropped (not used). Thus, when the probe detection signal is activated, the originally received packet in network device B 130 is routed back to the input port upon which it was received. Alternatively, if the probe detection signal is not activated, such as is the case for normal switch traffic, then the rewritten packet 722, which was rewritten by the layer 3 hardware 340, passes through the AND gate 720 and OR gate 730 to the output port selection logic 740. In this case, the rewritten packet 722 passes to the output port 764 and is transmitted on an output port of the network device as dictated by the rewritten packet 722. Thus, the output pipeline selects the output port based on the probe detection signal. Additionally, the probe detection signal dictates what packet 712, 722 is directed to the output port and the other packet is dropped. Additionally, UDP header information controls which output port is used and which packet is transmitted.

Figure 8:
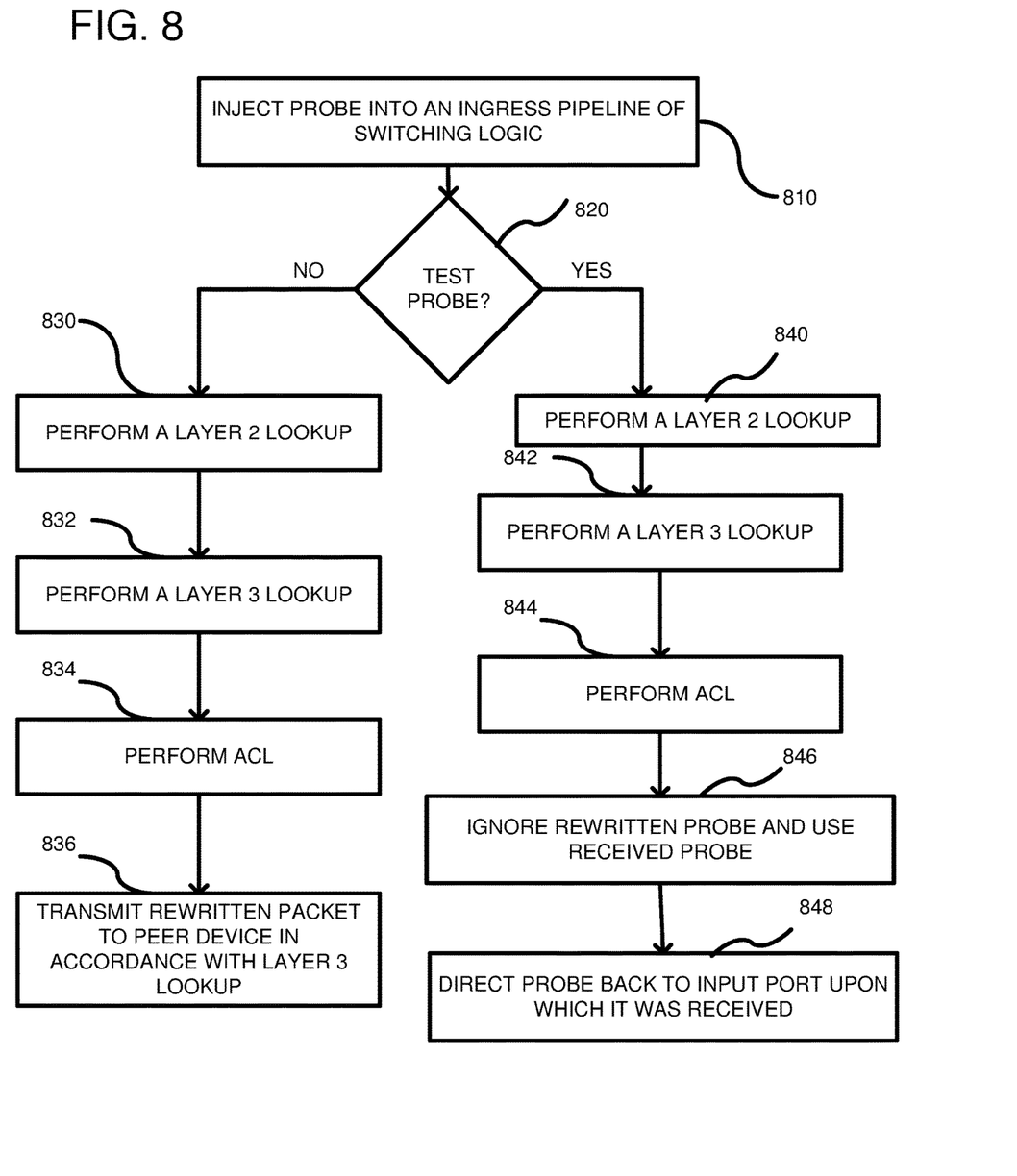
FIG. 8 is a detailed flowchart according to one embodiment for processing a packet on network device B.

FIG. 8 is a flowchart according to one embodiment for testing forwarding rules in a network device. In process block 810, a probe is injected into an ingress pipeline of switching logic. For example, in FIG. 2, a testing application 260 injects a probe 270 into switching logic 230. In decision block 820, a check is made to determine whether the probe is a test probe or a packet associated with normal network traffic. If the packet is associated with normal network traffic, then in process block 830, a layer 2 lookup is performed in order to check that the MAC address is equal to the router's MAC. If so, then in process block 832, a layer 3 lookup is performed and the packet is rewritten in accordance with the layer 3 lookup. In process block 834, ACL hardware is performed to determine whether additional rules should be applied to the packet. Finally, in process block 836, the packet is transmitted to a peer device in accordance with the layer 3 lookup. Returning to FIG. 7, the packet 722 is written to the output port 764 because the probe detection signal 556 is deactivated. The output port (i.e., one of the ports 310) that is selected is controlled by the packet 722.

If, alternatively, the packet is a test probe, then decision block 820 is answered in the affirmative and the process continues to process block 840. In process block 840, a layer 2 lookup is performed to ensure that the test probe has a proper router MAC. In process block 842, a layer 3 lookup is performed on the probe. In process block 844, the packet goes through ACL hardware. The output of the ACL hardware is a packet that is rewritten according to the layer 3 hardware in process block 842. In process block 846, that rewritten packet is ignored and dropped. Instead, in process block 848, the probe packet received on the input port is reflected back on the same input port to be sent back to the source device. Returning to FIG. 7, the received packet 712 passes through to the port selection logic 740 due to the activated probe detection signal and the selected output port 762 is the port upon which the packet was originally received.

Figure 9:
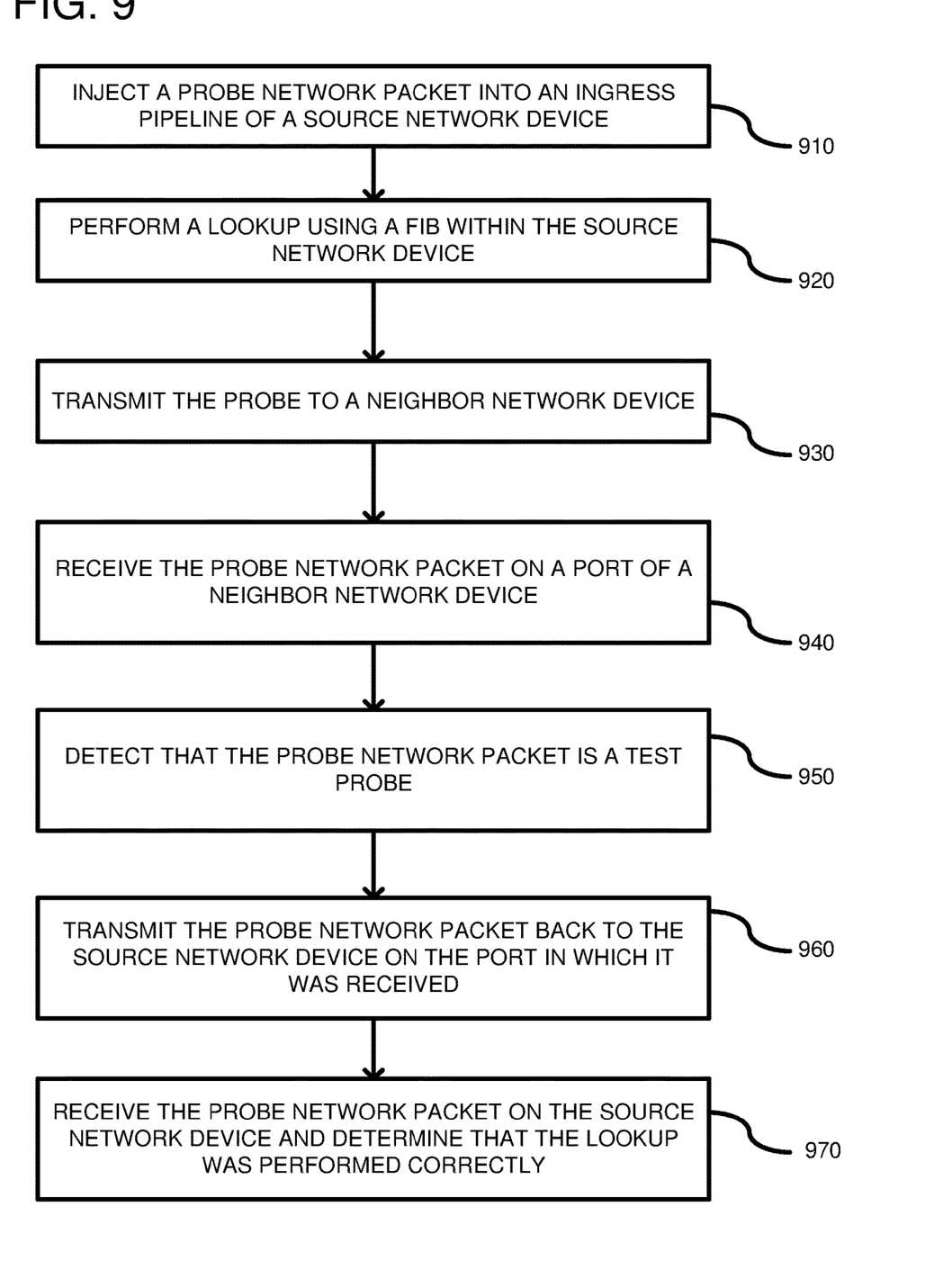
FIG. 9 is a flowchart according to one embodiment for testing forwarding rules on a network device.

FIG. 9 is a flowchart according to one embodiment for testing forwarding tables in a network device. In process block 910, a probe network packet is injected into an ingress pipeline of a source network device. For example, turning to FIG. 2, an agent 260 controlling the testing of the forwarding tables can inject the probe 270 into the switching logic 230. Such an injection can designate the CPU port on the switching logic 230 to inject the probe 270 into the input pipeline. In process block 920, a lookup is performed using a FIB on the source network device. In FIG. 2, the probe 270 can undergo a layer 2 hardware lookup 252 to ensure that the probe's MAC address matches the MAC address of the network device 120. If there is a match, then a layer 3 lookup can occur by the layer 3 hardware 254. In particular, the agent ensures that the probe 270 includes an IP address that is within the FIB 255 so that the layer 3 lookup can be fully exercised. The layer 3 hardware can determine a proper output port 242 on which to forward the probe. As a result of the layer 3 lookup, the probe is rewritten, as shown at 280, so as to include an updated layer 2 and layer 3 header. In process block 930, the probe is transmitted to the neighbor network device. Thus, in FIG. 1, the probe 150 is transmitted to network device B 130. In process block 940, the probe network packet is received on a port of the neighbor network device. For example, in FIG. 3, the network device B 130 receives the probe on one of the ports 310. In the example of FIG. 3, the probe is being received on port 1. In process block 950, a detection can be made that the probe network packet is a test probe. Such a detection can be made by the probe detection circuitry 328 of FIG. 3. The detection is made by comparing source and destination ports in a UDP header of the test probe to stored source and destination ports on the network device B 130. In one embodiment, the source and destination ports in the probe can be compared against a source and destination port in a global register 560 (FIG. 5). In another embodiment, the source and destination ports in the probe can be compared against source and destination ports stored in an ACL at the front end of the pipeline (see 328, FIG. 6). In process block 960, if the network device B 130 detects that the input packet is a probe, then it transmits the probe back to the source device on the port in which it was received. For example, in FIG. 3, the output pipeline 354 receives a probe detection signal 352 and, in response, transmits the probe back onto port 1 to reflect the probe back to the source device (see 160 in FIG. 1). In process block 970, the source device can receive the probe back and determine that the lookup was performed correctly. For example, in FIG. 4, the rewritten probe can be received back into network device A 120 and ACL hardware 250 detects that it is a probe by again matching on the UDP header. The probe is then redirected back to the CPU 210 for testing by the agent. The agent can check that the reflected probe was returned by the expected neighbor device proving that the original layer 2 and layer 3 lookups performed on the source device were correct. Additional probes can be transmitted by the network device A 120 so as to test additional states of the FIB 255.

Figure 10:
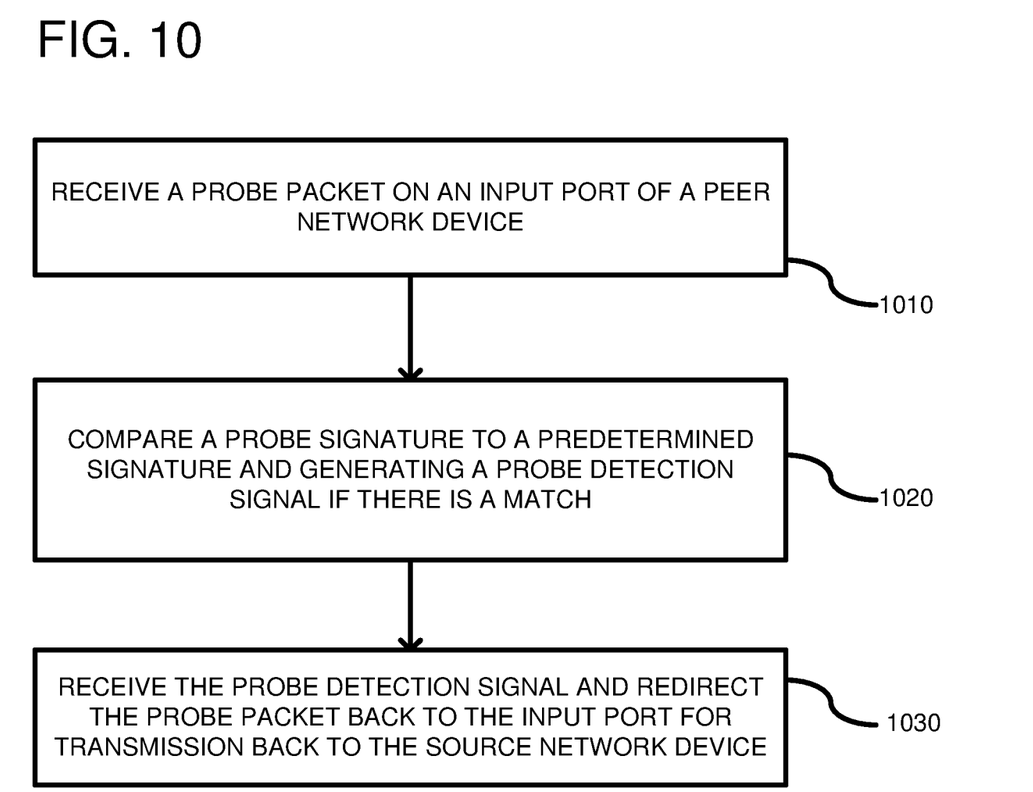
FIG. 10 is a flowchart according to another embodiment for testing forwarding rules on a network device.

FIG. 10 is a flowchart according to another embodiment for testing forwarding states. In process block 1010, a probe packet is received on an input port of a peer network device. For example, in FIG. 3, the rewritten probe 280 is shown being received on port 1 320. The peer network device is a peer with respect to the source device that injected the probe. In some embodiments, a peer network device is directly coupled to the source network device through cables. In process block 1020, a comparison is made between a probe signature and a predetermined probe signature. In one example, the probe signature can be associated with a layer 4 header, such as a TCP header or a UDP header. For example, source and destination ports within the UDP header of the probe can be compared to predetermined source and destination ports stored on the peer network device. If there is a match, then a probe detection signal is activated. For example, probe detection signal 556 (FIG. 5) or 656 (FIG. 6) can be activated to alert the output pipeline (530 or 630) to divert the packet back to the receiving port and ignore the layer 3 lookup result. In process block 1030, the probe detection signal can be detected and the probe redirected to the input port. In FIG. 7, for example, the output port selection logic 740 (which can be a switch), can divert the packet 712 back on the input port upon which it was received.

Figure 11:
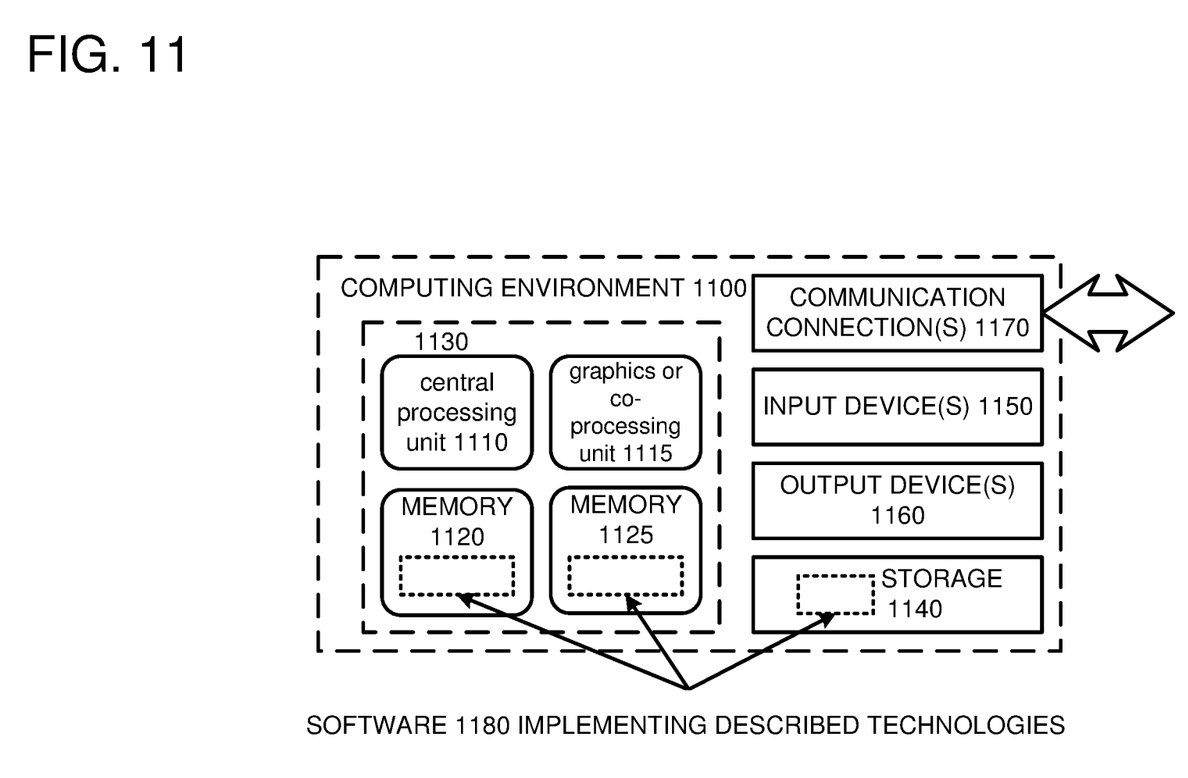
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., desktop computer, laptop computer, server computer, tablet computer, etc.). As shown herein, components of FIG. 11 can be incorporated into the network device 120, network device 130 or the centralized network controller 170.

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of testing forwarding tables, the method comprising:
   in a source network device, injecting a probe network packet into an input pipeline of the source network device;
   performing a lookup on the probe network packet using a Forwarding Information Base (FIB) within the source network device so as to test the FIB on the source network device;
   transmitting the probe network packet from the source network device to a neighbor network device based on the lookup;
   receiving the probe network packet on a port within the neighbor network device;
   detecting, using hardware within the neighbor network device, that the probe network packet was received by matching a source port and a destination port in a User Datagram Protocol (UDP) header of the probe network packet against expected source and destination ports, wherein the hardware for the matching includes an Access Control List (ACL) circuit having a plurality of registers for storing source and destination ports for matching against;
   transmitting the probe network packet back to the source network device on the port in which the probe network packet was received; and
   receiving the probe network packet on the source network device and determining that the lookup in the FIB was performed correctly by comparing the probe network packet to an expected result.

2. The method of claim 1, wherein the hardware for the matching includes a global register that is accessible for packets on multiple input ports of the neighbor network device, wherein the global register includes a source port and a destination port for matching against.

3. The method of claim 1, further including generating a probe detection signal in the neighbor network device in response to the detecting, the probe detection signal being transmitted to an output pipeline on the neighbor network device, wherein the output pipeline, in response to the probe detection signal, ignores a layer 3 lookup port determination and redirects the probe network packet to the port on which the probe network packet was received.

4. The method of claim 3, wherein a rewrite of the probe network packet by layer 3 hardware on the neighbor network device is ignored by the output pipeline.

5. The method of claim 1, further including transmitting the probe network packet on the source network device to an agent executing on the source network device after the receiving of the probe network packet on the source network device.

6. A method, comprising:
   receiving, from a source network device, a probe packet on an input port of a peer network device;
   performing a layer 3 lookup in the peer network device on the probe packet and rewriting the probe packet in accordance with the layer 3 lookup;
   comparing a signature in the probe packet to a predetermined signature and generating a probe detection signal and ignoring the rewritten packet if there is a match; and
   in an output pipeline of the peer network device, receiving the probe detection signal and redirecting the probe packet back to the input port for transmission back to the source network device.

7. The method of claim 6, wherein the comparing is performed by hardware that matches a register that is accessible by multiple input pipelines of the peer network device, wherein the register includes the signature, which is a source port and a destination port associated with a UDP header of the probe packet.

8. The method of claim 6, wherein the comparing is performed by an Access Control List (ACL) hardware in the peer network device prior to transmitting the received probe packet to an input pipeline.

9. The method of claim 6, wherein the probe packet is injected in the source network device by an agent executing on the source network device.

10. The method of claim 6, wherein the source network device performs layer 2 and layer 3 lookups to generate the probe packet.

11. The method of claim 6, further including receiving the probe packet, from the peer network device, in the source network device on an input port of the source network device, detecting a signature on the probe packet in the source network device, and testing whether the probe packet was received from the peer network device based on the input port to determine whether a lookup on the source network device was properly performed.

12. The method of claim 6, wherein the peer network device is a network router.

13. An Integrated Circuit (IC), comprising:
   probe detection circuitry for determining that a probe network packet is a probe by comparing a signature of the probe against a predetermined signature and for generating a probe detection signal;
   layer 3 circuitry for performing a lookup, wherein the layer 3 circuitry is within an input pipeline, which includes layer 2 circuitry; and an output pipeline for receiving the probe detection signal and for routing the probe network packet to an input port on which the probe network was received in response to the probe detection signal.

14. The IC of claim 13, wherein the signature includes source and destination ports in a User Datagram Protocol (UDP) header.

15. The IC of claim 13, wherein the probe detection circuitry includes a register that is accessible to multiple input pipelines.

16. The IC of claim 13, wherein the probe detection circuitry is within an Access Control List (ACL) circuit that includes a plurality of source and destination ports to match against the source and destination ports in the UDP header.

17. The IC of claim 13, wherein the IC is within a network device used for switching packets.

* * * * *